United States Patent
Das et al.

(10) Patent No.: US 11,907,114 B2
(45) Date of Patent: Feb. 20, 2024

(54) DEVICES, SYSTEMS, AND METHODS FOR DYNAMICALLY REMAPPING MEMORY ADDRESSES

(71) Applicant: SMART IOPS, INC., Milpitas, CA (US)

(72) Inventors: Ashutosh Kumar Das, Cupertino, CA (US); Manuel Antonio d'Abreu, El Dorado Hills, CA (US)

(73) Assignee: SMART IOPS, INC., Milpitas, CA (US)

( * ) Notice: Subject to any disclaimer, the term of this patent is extended or adjusted under 35 U.S.C. 154(b) by 24 days.

(21) Appl. No.: 16/996,810

(22) Filed: Aug. 18, 2020

(65) Prior Publication Data
US 2021/0049094 A1 Feb. 18, 2021

Related U.S. Application Data

(60) Provisional application No. 62/888,507, filed on Aug. 18, 2019.

(51) Int. Cl.
| | | |
|---|---|---|
| G06F 12/02 | (2006.01) | |
| G06F 12/0873 | (2016.01) | |
| G06F 13/16 | (2006.01) | |
| G06F 12/1045 | (2016.01) | |

(52) U.S. Cl.
CPC ...... *G06F 12/0246* (2013.01); *G06F 12/0873* (2013.01); *G06F 12/1045* (2013.01); *G06F 13/1668* (2013.01); *G06F 2212/7201* (2013.01)

(58) Field of Classification Search
CPC ............. G06F 12/0246; G06F 12/0873; G06F 12/1045; G06F 13/1668; G06F 2212/7201
See application file for complete search history.

(56) References Cited

U.S. PATENT DOCUMENTS

| | | |
|---|---|---|
| 6,904,490 B2 | 6/2005 | Arimilli et al. |
| 8,112,395 B2 | 2/2012 | Patel et al. |
| 8,468,292 B2 | 6/2013 | Aszmann et al. |

(Continued)

OTHER PUBLICATIONS

A Space-Efficient Flash Translation Layer for Compactflash Systems by Kim 2002 (Year: 2002).*

(Continued)

*Primary Examiner* — Paul M Knight
(74) *Attorney, Agent, or Firm* — MT HUNT LAW; Marcus T. Hunt

(57) ABSTRACT

In certain aspects, dynamic remapping of memory addresses is provided and includes initiating a remapping of a logical block from a "mapped block" to a "remapped block." Logical address locations for the logical block are mapped to physical address locations in the mapped block. The mapped and remapped blocks include non-volatile memory. A read command is received and determined to be for reading from a logical address location of the logical block, and the logical address location is determined to be mapped to a physical address location. Data is read from the physical address location of the mapped block. A write command is received and determined to be for writing data to the logical address location. Data is written to the physical address location of the remapped block. The read command is received after the initiation of the remapping and before the writing of the data to the remapped block.

20 Claims, 6 Drawing Sheets

(56) References Cited

U.S. PATENT DOCUMENTS

| | | |
|---|---|---|
| 9,047,187 B2 | 6/2015 | Guo et al. |
| 9,244,831 B2 | 1/2016 | Maghraoui et al. |
| 9,442,669 B2 | 9/2016 | Nicolae |
| 9,489,296 B1 * | 11/2016 | Tomlin ................. G06F 12/0246 |
| 9,530,491 B1 | 12/2016 | Uttarwar et al. |
| 9,612,952 B2 | 4/2017 | Hayes et al. |
| 10,222,984 B1 | 3/2019 | O'Brien et al. |
| 10,228,878 B1 | 3/2019 | Mateescu et al. |
| 10,552,085 B1 | 2/2020 | Chen et al. |
| 10,776,024 B2 | 9/2020 | Yuan |
| 2008/0109592 A1 | 5/2008 | Karamcheti et al. |
| 2008/0288717 A1 | 11/2008 | Torabi |
| 2009/0168525 A1 | 7/2009 | Olbrich et al. |
| 2010/0122148 A1 | 5/2010 | Flynn et al. |
| 2010/0174847 A1 | 7/2010 | Paley et al. |
| 2010/0306447 A1 | 12/2010 | Lin et al. |
| 2011/0060927 A1 | 3/2011 | Fillingim et al. |
| 2012/0246391 A1 | 9/2012 | Meir et al. |
| 2013/0124794 A1 | 5/2013 | Bux et al. |
| 2013/0290277 A1 | 10/2013 | Chambliss et al. |
| 2014/0143213 A1 | 5/2014 | Tal et al. |
| 2014/0143481 A1 | 5/2014 | Asnaashari et al. |
| 2014/0304453 A1 * | 10/2014 | Shao ................. G06F 12/0246 711/103 |
| 2015/0117107 A1 | 4/2015 | Sun et al. |
| 2015/0293809 A1 | 10/2015 | Liang et al. |
| 2015/0347302 A1 | 12/2015 | Hagersten et al. |
| 2016/0062885 A1 * | 3/2016 | Ryu ................. G06F 12/0253 711/103 |
| 2016/0118132 A1 | 4/2016 | Prins et al. |
| 2016/0179371 A1 | 6/2016 | Sinclair |
| 2016/0179386 A1 | 6/2016 | Zhang |
| 2016/0267012 A1 | 9/2016 | Konuma et al. |
| 2016/0342509 A1 | 11/2016 | Kotte et al. |
| 2018/0052768 A1 * | 2/2018 | Bae ................. G06F 12/0246 |
| 2019/0087328 A1 | 3/2019 | Kanno et al. |
| 2019/0121726 A1 * | 4/2019 | Hsu ................. G06F 12/0246 |
| 2020/0097216 A1 | 3/2020 | Marcu et al. |
| 2020/0104067 A1 | 4/2020 | Shaharabany et al. |
| 2020/0133808 A1 | 4/2020 | Patel et al. |

OTHER PUBLICATIONS

Exploiting Sequential and Temporal Localities to Improve Performance of NAND Flash-Based SSDs; Lee et al.; ACM Transactions on Storage, vol. 12, iss. 3, Article No. 15; Jun. 2016 (Year: 2016).

SSDExplorer: a Virtual Platform for Performance/Reliability-Oriented Fine-Grained Design Space Exploration of Solid State Drives; Zuolo et al.; IEEE Transactions on Computer-Aided Design of Integrated Circuits and Systems, vol. 34, iss. 10, pp. 1627-1638; Oct. 2015 (Year: 2015).

* cited by examiner (e.g., Logical Block No. 5)

DEVICES, SYSTEMS, AND METHODS FOR DYNAMICALLY REMAPPING MEMORY ADDRESSES

CROSS-REFERENCE TO RELATED APPLICATIONS

This application claims the benefit of U.S. Provisional Application No. 62/888,507, filed Aug. 18, 2019, the entirety of which is incorporated herein by reference.

FIELD

The present disclosure relates generally to the field of data storage, and more particularly to memory management.

BACKGROUND

Non-volatile memory systems, such as solid state drives (SSDs) including Flash memory, use logical-to-physical mappings to map logical addresses to physical addresses within the non-volatile memory. Directly mapping logical addresses to physical addresses can be inflexible, presenting design challenges when a change in mapping is desired. For example, Flash memory, can be susceptible to wear out. Once a page has been written or erased many times, information may not be stored reliably inside the non-volatile memory, and may require a change in physical address mapping. There can be various reasons other than wear out that memory may need to be remapped.

SUMMARY

In certain aspects of the present disclosure, a data storage system is provided and includes non-volatile memory and one or more controllers coupled to the non-volatile memory. The one or more controllers are configured to initiate a remapping of a first logical block from a mapped block to a remapped block. A plurality of logical address locations for the first logical block is mapped to a plurality of physical address locations in the mapped block. The mapped block and the remapped block include the non-volatile memory. The one or more controllers are further configured to: receive a first read command; determine that the first read command is for reading from a first logical address location of the first logical block; determine that the first logical address location is mapped to a first physical address location of the plurality of physical address locations; read first data from the first physical address location of the mapped block; receive a first write command; determine that the first write command is for writing second data to the first logical address location of the first logical block; and write the second data to the first physical address location of the remapped block. The receiving of the first read command occurs at a time: after the initiating of the remapping of the first logical block; and before the writing of the second data to the first physical address location of the remapped block.

In some aspects of the present disclosure, a method for dynamically remapping memory addresses in a data storage system is provided and includes initiating a remapping of a first logical block from a mapped block to a remapped block. A plurality of logical address locations for the first logical block is mapped to a plurality of physical address locations in the mapped block, and the mapped block and the remapped block include non-volatile memory. The method further includes receiving a first read command; determining that the first read command is for reading from a first logical address location of the first logical block; determining that the first logical address location is mapped to a first physical address location of the plurality of physical address locations; reading first data from the first physical address location of the mapped block; receiving a first write command; determining that the first write command is for writing second data to the first logical address location of the first logical block; and writing the second data to the first physical address location of the remapped block. The receiving of the first read command occurs at a time: after the initiating of the remapping of the first logical block; and before the writing of the second data to the first physical address location of the remapped block.

In some aspects of the present disclosure, a non-transitory machine-readable storage medium storing machine-executable instructions is provided that, when executed, cause a system to perform a method for dynamically remapping memory addresses. The method includes initiating a remapping of a first logical block from a mapped block to a remapped block. A plurality of logical address locations for the first logical block is mapped to a plurality of physical address locations in the mapped block, and the mapped block and the remapped block include non-volatile memory. The method further includes receiving a first read command; determining that the first read command is for reading from a first logical address location of the first logical block; determining that the first logical address location is mapped to a first physical address location of the plurality of physical address locations; reading first data from the first physical address location of the mapped block; receiving a first write command; determining that the first write command is for writing second data to the first logical address location of the first logical block; and writing the second data to the first physical address location of the remapped block. The receiving of the first read command occurs at a time: after the initiating of the remapping of the first logical block; and before the writing of the second data to the first physical address location of the remapped block.

BRIEF DESCRIPTION OF THE DRAWINGS

For a better understanding of at least an embodiment, reference will be made to the following Detailed Description, which is to be read in conjunction with the accompanying drawings, wherein.

DETAILED DESCRIPTION

Figure 1A:
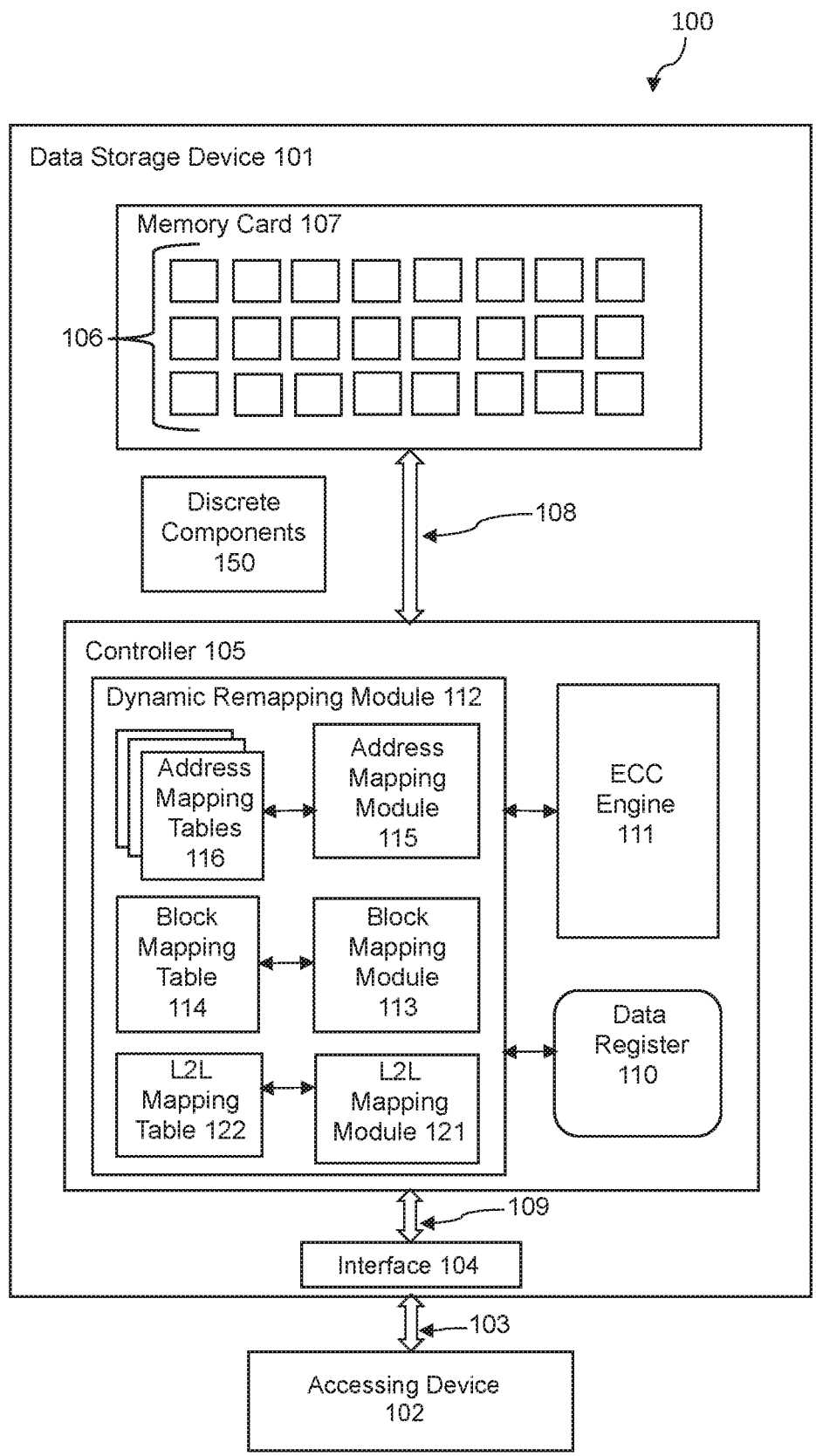
FIG. 1A illustrates a block diagram of an example data storage system having dynamic remapping capability, according to an embodiment.

Before aspects of the present disclosure are described below with reference to the drawings in the description, common features may be designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

The terms "physical memory block" (or "physical block") is used herein to refer to a collection of physical address locations inside memory where read and write operations can be performed. In different implementations, the physical memory block can refer to a portion of a memory die (or integrated circuit), the memory die, or more than one memory die. For example, in the case of NAND Flash memory, the physical memory block can refer to a portion of the die, the die, or more than one die in different implementations. The term "logical memory block" (or "logical block") is used herein to refer to a collection of logical address locations for memory where read and write operations can be performed.

Data storage systems implementing non-volatile memory devices that are susceptible to wear out, such as Flash memory, can have physical memory blocks that become unreliable or go bad due to wearing. Furthermore, certain physical blocks tend to be written to more often than others, so wear out can occur more quickly in these physical blocks versus other physical blocks that are used less often. To provide wear leveling or to avoid bad physical blocks, it can be beneficial to remap the worn out physical blocks to more optimal functioning physical blocks. In certain aspects of the present disclosure, device, systems, and methods are provided herein that enable the dynamic remapping of physical blocks. It should be appreciated that there may be a wide variety of design reasons and considerations, other than wear, to remap physical blocks in data storage systems (or devices) using non-volatile memory, and that the dynamic remapping techniques (or schemas) taught herein are equally applicable.

Dynamically remapping to a new physical block while the system is "live" can present challenges because there is a transition time period while the remapping is in progress where data may still be stored in a "mapped block" (or the originating physical block) despite the remapping process having been initiated for the "remapped block" (or the target physical block). In certain aspects, the techniques for dynamic remapping memory taught herein overcome these challenges. The dynamic remapping techniques (or schemas) of the present disclosure can enable the dynamic remapping of logical address location to physical address locations within physical blocks to occur in real-time without interruption while the system is "live" or operational.

FIG. 1A illustrates a block diagram of an example data storage system having dynamic remapping capability, according to an embodiment. A data storage system 100 is shown including a data storage device (or system) 101 and an accessing (or host) device 102. The data storage device 101 and the accessing device 102 are coupled via a communication path 103, such as a bus or a wireless connection. The data storage device 101 can include an interface 104 (e.g., an accessing device interface) that enables communication via the communication path 103 between the data storage device 101 and the accessing device 102. The interface 104 can include, for example, a PCIe, SATA, USB, Open CAPI, or any other standard or proprietary interface.

The data storage device 101 is also shown including a controller 105 (e.g., a memory controller) and memory devices 106 on a memory card 107. The controller 105 and the memory devices 106 are coupled via a communication path 108, such as a bus. The memory devices 106 can include one or more memory dies. The controller 105 is coupled to the interface 104 via a communication path 109, such as a bus. In one embodiment, the controller 105 is an SSD controller and the memory devices 106 are non-volatile memory, such as Flash memory.

In an embodiment, the data storage device 101 can be embedded within the accessing device 102, such as in accordance with a Joint Electron Devices Engineering Council (JEDEC) Solid State Technology Association Universal Flash Storage (UFS) configuration. For example, the data storage device 101 can be configured to be coupled to the accessing device 102 as embedded memory, such as eMMC® (trademark of JEDEC Solid State Technology Association, Arlington, Virginia) and eSD, as illustrative examples. To illustrate, the data storage device 101 can correspond to an eMMC (embedded MultiMedia Card) device. As another example, the data storage device 101 can correspond to a memory card, such as a Secure Digital (SD®) card, a microSD® card, a miniSD™ card (trademarks of SD-3C LLC, Wilmington, Delaware), a MultiMediaCard™ (MMC™) card (trademark of JEDEC Solid State Technology Association, Arlington, Virginia), or a Compact-Flash® (CF) card (trademark of SanDisk Corporation, Milpitas, California). Alternatively, the data storage device 101 can be removable from the accessing device 102 (i.e., "removably" coupled to the accessing device 102). As an example, the data storage device 101 can be removably coupled to the accessing device 102 in accordance with a removable universal serial bus (USB) configuration.

In an embodiment, the data storage device 101 can include (or correspond to) a solid-state drive (SSD), which can be included in, or distinct from (and accessible to), the accessing device 102. For example, the data storage device 101 can include an SSD, which can be used as an embedded storage drive (e.g., a mobile embedded storage drive), an enterprise storage drive (ESD), a client storage device, or a cloud storage drive, as illustrative, non-limiting examples. In some implementations, the data storage device 101 can be coupled to the accessing device 102 indirectly, e.g., via a network. For example, the network can include a data center storage system network, an enterprise storage system network, a storage area network, a cloud storage network, a local area network (LAN), a wide area network (WAN), the Internet, and/or another network. In some implementations, the data storage device 101 can be a network-attached storage (NAS) device or a component (e.g., an SSD device) of a data center storage system, an enterprise storage system, or a storage area network.

In some implementations, the data storage device 101 can operate in compliance with a JEDEC industry specification. For example, the data storage device 101 can operate in compliance with a JEDEC eMMC specification, a JEDEC Universal Flash Storage (UFS) specification, one or more other specifications, or a combination thereof. In some implementations, the data storage device 101 and the accessing device 102 can be configured to communicate using one or more protocols, such as an eMMC protocol, a universal Flash storage (UFS) protocol, a universal serial bus (USB) protocol, a serial advanced technology attachment (SATA) protocol, and/or another protocol, as illustrative, non-limiting examples.

The accessing device 102 can include a memory interface (not shown) and can be configured to communicate with the data storage device 101 via the memory interface to read data from and write data to the memory devices 106 of the data storage device 101. For example, the accessing device 102 can operate in compliance with a Joint Electron Devices Engineering Council (JEDEC) industry specification, such as a Universal Flash Storage (UFS) Access Controller Interface specification. As other examples, the accessing device 102 can operate in compliance with one or more other specifications, such as a Secure Digital (SD) Access Controller specification, as an illustrative and non-limiting example. The accessing device 102 can communicate with the memory devices 106 in accordance with any other suitable communication protocol.

The accessing device 102 can include one or more processors and memory (not shown in FIG. 1A). The memory can be configured to store data and/or instructions that can be executable by the processor. The memory can be a single memory or can include multiple memories, such as one or more non-volatile memories, one or more volatile memories, or a combination thereof. The accessing device 102 can issue one or more commands to the data storage device 101, such as one or more requests to erase data, read data from, or write data to the memory devices 106 of the data storage device 101. For example, the accessing device 102 can be configured to provide data to be stored at the memory devices 106 or to request data to be read from the memory devices 106. The accessing device 102 can include, for example, a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, any other electronic device, or any combination thereof.

Figure 1B:
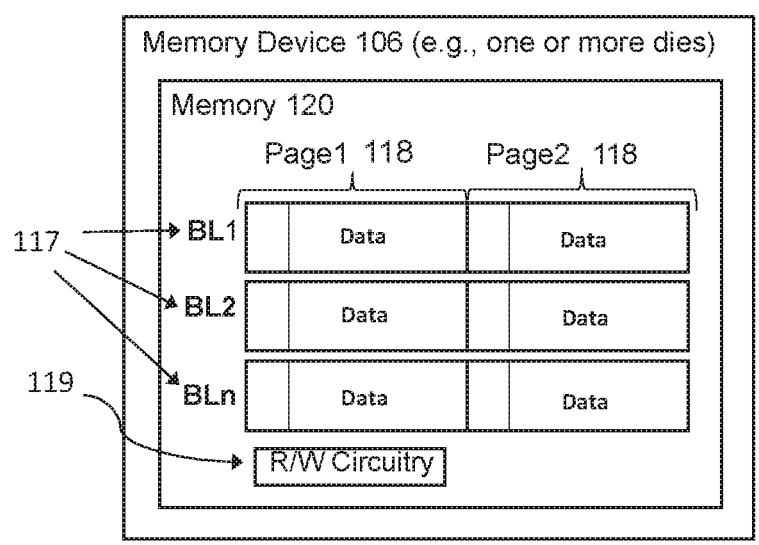
FIG. 1B illustrates a block diagram of an example memory device 106 of FIG. 1A, according to an embodiment

FIG. 1B illustrates a block diagram of an example memory device 106 of FIG. 1A, according to an embodiment. The memory device 106 can include one or more memory dies (e.g., one memory die, two memory dies, eight memory dies, or another number of memory dies). The memory device 106 includes one or more memory 120, such as a non-volatile memory of storage elements included in a memory die of the memory device 106. For example, the memory 120 can include a Flash memory, such as a NAND Flash memory, or a resistive memory, such as a resistive random access memory (ReRAM), as illustrative, non-limiting examples. In some implementations, the memory 120 can include (or correspond to) a memory die of the memory device 106. The memory 120 can have a three-dimensional (3D) memory configuration. As an example, the memory 120 can have a 3D vertical bit line (VBL) configuration. In a particular implementation, the memory 120 can be a non-volatile memory having a 3D memory configuration that is monolithically formed in one or more physical levels of arrays of memory cells having an active area disposed above a silicon substrate. Alternatively, the memory 120 can have another configuration, such as a two-dimensional (2D) memory configuration or a non-monolithic 3D memory configuration (e.g., a stacked die 3D memory configuration). While only a single memory 120 is shown in the memory device 106 for exemplary reasons in FIG. 1B, it should be appreciated that the discussion for the memory 120 can be applicable to any additional memory 120 implemented within the memory device 106.

The memory 120 can include one or more blocks 117, such as one or more NAND Flash erase blocks. To illustrate, the memory 120 may include at least one block 117 of storage elements (e.g., also referred to herein as memory cells). Each storage element of the memory 120 can be programmable to a state (e.g., a threshold voltage in a Flash configuration or a resistive state in a resistive memory configuration) that indicates one or more values. In some implementations, the memory 120 can include multiple blocks 117. Each block 117 of the memory 120 can include one or more word lines. Each word line can include one or more pages 118, such as one or more physical pages. In some implementations, each page 118 may be configured to store a codeword. A word line may be configurable to operate as a single-level-cell (SLC) word line, as a multi-level-cell (MLC) word line, or as a tri-level-cell (TLC) word line, as illustrative, non-limiting examples.

The memory device 106 can include support circuitry, such as read/write circuitry 119, to support operation of one or more memory dies of the memory device 106. The read/write circuitry 119 can be divided into separate components, such as read circuitry and write circuitry. The read/write circuitry 119 can be external to the one or more dies of the memory device 106. Alternatively, one or more individual memory dies of the memory device 106 can include corresponding read/write circuitry 119 that is operable to read data from, and/or write data to, storage elements within the individual memory die independent of any other read and/or write operations at any of the other memory dies.

Returning to FIG. 1A, the controller 105 can manage communication to the accessing device 102, access to the memory devices 106, and memory management software. The controller 105 can communicate with the memory devices 106 via the communication path 108. The communication path 108 can be implemented, for example, as a bus having one or more channels to enable the controller 105 to communicate with a single memory die of the memory device 106. As another example, the communication path 108 can be implemented as a bus having multiple distinct channels to enable the controller 105 to communicate with each memory die of the memory devices 106 in parallel with, and independently of, communication with other memory dies of the memory device 106.

The controller 105 is configured to receive data and instructions from the accessing device 102 and to send data to the accessing device 102. For example, the controller 105 may send data to the accessing device 102 via the interface 104, and the controller 105 may receive data from the accessing device 102 via the interface 104. The controller 105 is configured to send data and commands to the memory 120, and to receive data from the memory 120, via the communication path 108. For example, the controller 105 is configured to send data and a write command to cause the memory 120 to store data to a physical address location (or physical address) of the memory 120. The write command can specify a physical address location of a portion of the memory 120 (e.g., a physical address location of a word line of the memory 120) that is to store the data. The controller 105 can also be configured to send data and commands to the memory 120, such as associated with background scanning operations, garbage collection operations, and/or wear leveling operations, etc., as illustrative, non-limiting examples. The controller 105 can also be configured to send a read command to the memory 120 to access data from a specified physical address location of the memory 120. The read command can, for example, specify the physical address location of a portion of the memory 120 (e.g., a physical address location of a word line of the memory 120).

The controller 105 is shown including a data register 110, an ECC engine 111, and a dynamic remapping module 112. The data register 110 is coupled to the accessing device 102 via the interface 104 and the communication paths 103 and 109. The data register 110 is also coupled to the ECC engine 111, which is coupled to the memory 106 via communication path 108. The data register 110 can receive incoming data from the accessing device 102 that is intended to be stored in the memory devices 106.

The ECC engine 111 can process (e.g., add error correction codes) the incoming data before being sending the incoming data to the memory devices 106 via the communication path 108. The ECC engine 111 can also process (e.g., check for errors, remove error correction codes, etc.) when data is read from the memory devices 106 and sent to the accessing device 102. The ECC engine 111 can include an encoder configured to encode the data using an ECC encoding technique. For example, the ECC engine 111 can include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples. The error correction is not necessarily required in all embodiments. In another embodiment, the error correction is not implemented and the data storage device 101 does not include the ECC engine 111.

The data storage device 101 is also shown including discrete components 150. The discrete components 150 can be implemented to assist with various operations of the storage device 101, and can include passive components such as capacitors, resistors, and inductors, as well as active components such as diodes and transistors. This list of components is an illustrative and not exhaustive.

The dynamic remapping module 112 enables the dynamic remapping of memory within the memory devices 106 to occur in real-time without interruption while the system is "live" or operational. The dynamic remapping module 112 manages logical to physical address mappings of the memory devices 106. For example, the accessing device 102 can send the controller 105 a command to read from or write to a logical address. The command can be received within the data register 110, for instance, and then provided to the dynamic remapping module 112. If the controller 105 is configured to provide any additional or miscellaneous processing of the incoming command or data, then the necessary data can be acquired from the data register 110 and processed. The dynamic remapping module 112 identifies the logical address and maps (or translates) the logical address to a logical block (e.g., logical block number) and a logical address location for (or specific to) the logical block. The logical address locations can include any type of identifying information, such as page number, segment number, etc. The dynamic remapping module 112 manages mapping tables to map the logical block and logical address locations to physical memory blocks (also referred to herein as physical blocks) and physical address locations within the physical blocks. Each of the memory devices 106 can include one or more physical blocks. Once the physical block and physical address location are acquired (or determined), they can be included as control information within a data packet along with the read command or write command with the data to be written. The ECC engine 111 can perform error correction on the data packet before sending the data packet to the corresponding memory device 106 having the physical block so the read or write operation can be performed at the physical address location in the physical block. If the command is a read command, then the data within the physical address location in the physical block is read and sent back to the controller 105 and then to the accessing device 102. If the command is a write command, then the data to be written is also sent and written to the physical address location in the physical block.

The dynamic remapping module 112 is shown including a block mapping module (or submodule) 113, a block mapping table 114, an address mapping module (or submodule) 115, one or more address mapping tables 116, a logical to logical (L2L) mapping module 121, and a L2L mapping table 122. The block mapping table 114, the address mapping tables 116, and the L2L mapping table 122 can be stored in memory internal or external to the controller 105, such as in dynamic random-access memory (DRAM) or other memory.

The L2L mapping module 121 maps logical addresses to logical blocks and to logical address locations for (or specific to) the logical blocks. The logical address locations can include any type of identifying information, such as page number, segment number, etc. The L2L mapping module 121 can store and maintain the mappings of the logical addresses to the logical blocks and the logical address locations within the L2L mapping table 122. In this way, when a command to read from or write to a logical address is received (e.g., from the accessing device 102), the L2L mapping module 121 can acquire a logical block and logical address location for the logical block by accessing (or referencing) the L2L mapping table 122. Any variety of schemas can be implemented to assign the logical block and logical address locations for the logical block. As an illustrative and non-limiting example, 1 terabyte of logical address locations can be implemented evenly across 20 logical blocks (e.g., logical blocks 1-20), with 50 gigabytes of logical address locations for each logical block. Alternatively, as another example, the number of logical address locations in each of the logical block can vary from one another, such as to accommodate different non-volatile memory capabilities, features, etc.

In another embodiment, the mapping operation provided by the L2L mapping module 121 is not required, and the L2L mapping module 121 and L2L mapping table 122 may not be implemented in the dynamic remapping module 112. For example, the read or write command that is received from the accessing device can include information identifying the logical block number and logical address location.

The block mapping module 113 manages the mappings and remappings of the logical blocks to the physical blocks (e.g., physical block numbers) implemented, which are stored in the block mapping table 114. The term "mapped block" is used herein to refer to a physical block that a logical block is mapped to. The term "remapped block" is used herein to refer to a physical block that a logical block is remapped to. During the remapping process, the mapped block may also be referred to as the "originating block" and the remapped block referred to as the "target block." Additional details for the block mapping table 114 are provided in the description for FIG. 2.

The address mapping module 115 manages the mappings of the logical address locations for the logical blocks to physical address locations within the physical blocks, which are stored in the address mapping tables 116. For example, an address mapping table 116 can be generated for each logical block and can include: the logical address locations for the logical block, and the physical address locations to which the logical address locations are mapped.

The address mapping module 115 can also manage and track whether logical address locations are mapped to physical address locations within the mapped block or within the remapped block during the remapping process (or transition period). For instance, the address mapping table 116 can also include remapping statuses for the logical address locations, which indicate whether the logical address locations are mapped to physical address locations within the mapped block or within the remapped block. Additional details for the address mapping tables 116 are provided in the description for FIG. 3. It should be appreciated that in other embodiments one or more of the modules 113, 115, and 121 can be combined and implemented as a single module to perform the associated functions of the modules that are combined. It should also be appreciated that in other embodiments one or more of the tables 114, 116, and 122 can be combined and implemented into a single module to perform the associated functions of the tables that are combined.

Figure 2:
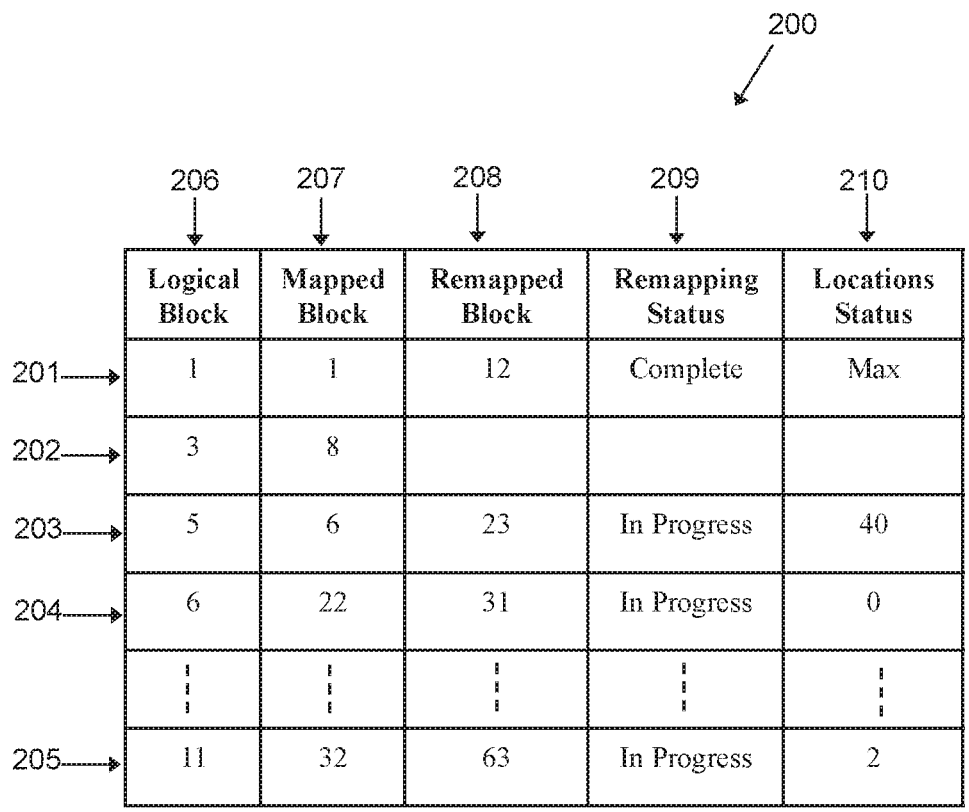
FIG. 2 illustrates a diagram of an example block mapping table, according to an embodiment.

FIG. 2 illustrates a diagram of an example block mapping table, according to an embodiment. A block mapping table 200 is shown and includes records (or rows) for the logical blocks that are implemented. For the sake of clarity and brevity, only records for five example logical blocks— logical block numbers 1, 3, 5, 6, and 11—are shown within records 201, 202, 203, 204, 205, respectively. However, it should be appreciated that records for any additional logical blocks (e.g., logical block number 2, 4, 7-10, etc.) can be included in the block mapping table 200, although not shown, as represented by the dashed lines. The number of logical blocks can vary depending on application and design.

The block mapping table 200 includes the following fields (or columns): a logical block 206, a mapped block 207 that the logical block is mapped to, a remapped block 208 that the logical block 206 is remapped to, a remapping status 209 of the logical block 206, and a locations status 210 of logical address locations for the logical block 206. The remapping status 209 indicates the status of the remapping of the logical block 206, such as whether the remapping of the logical block 206 is "in progress" or "completed" for instance. For example, once the remapping process of the logical block 206 from mapped block 207 to remapped block 208 has been initiated, the remapping status 209 is changed to "in progress" (or transitioning). The remapping process remains in progress until a write operation has been performed to the remapped block 208 for all applicable logical address locations for the logical block 206, at which point the remapping process for the logical block 206 is completed.

It should be appreciated that the logical block 206, the mapped block 207, and the remapped block 208 are shown as block numbers in this embodiment but can be any other suitable identifier in other embodiments. Furthermore, the locations status 210 is shown as a count (or number) in the embodiment shown, but can include any other suitable indicator (e.g., percentage) in other embodiments.

The locations status 210 tracks the remapping status of all logical address locations for the logical block 206. A logical address location is referred to as "remapped" herein when a write to the remapped block 208 has occurred (or been performed) for the logical address location after the remapping process of the logical block 206 has been initiated. The term "initial write" is used herein to refer to the first time a write occurs to the remapped block 208 for the logical address location after the remapping process of the logical block 206 has been initiated.

In one embodiment, the locations status 210 can include a number indicating a count for the number of logical address locations that have been remapped. For example, once the remapping process of the logical block 206 has been initiated, the locations status 210 can be set to "0" to indicate no logical address locations have been remapped yet. If, for example, the logical block 206 has 100 logical address locations and a write to the remapped block 208 has occurred for 40 of the logical address locations since the remapping process was initiated, then "40" is indicated in the locations status 210. Furthermore, each subsequent time a write to the remapped block 208 occurs for a new logical address location (i.e., different from one of the 40 already remapped) of the logical block 206, the count increments by 1. When the count reaches the total number of logical address locations for the logical block 206, the count has reached its "max" and the remapping status 209 can be changed from "in progress" to "complete."

As an example, in record 203, logical block number 5 is mapped to mapped block number 6 and is in the process of being remapped to remapped block number 23. Furthermore, a write to the remapped block number 23 has occurred for 40 of the logical address locations for the logical block number 5 since the remapping of logical block number 5 was initiated. In record 204, logical block number 6 is mapped to mapped block number 22 and is in the process of being remapped to remapped block number 31. Furthermore, none of the logical address locations for the logical block number 6 have yet been remapped since the remapping of logical block number 6 was initiated. In record 202, logical block number 3 is mapped to mapped block number 8 and is not currently remapped to any other physical block. In record 201, the remapping of logical block number 1 from mapped block number 1 to remapped block number 12 is complete since a write has occurred for all logical address locations of logical block number 1, as indicated by reaching the "max" value in the locations status 210 and resulting remapping status 209 of "complete."

In one embodiment, once the remapping is complete, the remapped block 208 is reset as the "new" mapped block 207. For instance, in the example shown for the record 201, the value "12" can be moved from the remapped block 208 to the mapped block 207 to indicate that the logical block number 1 is now mapped to mapped block number 12. Further, the entries for the remapped block 208, the remapping status 209, and the locations status 210 can all be cleared. When the logical block number 1 is again remapped in the future, a new remapped block number can be input as the remapped block 208; the remapping status 209 can be indicated as "in progress;" and the locations status 210 can be set to "0."

Figure 3:
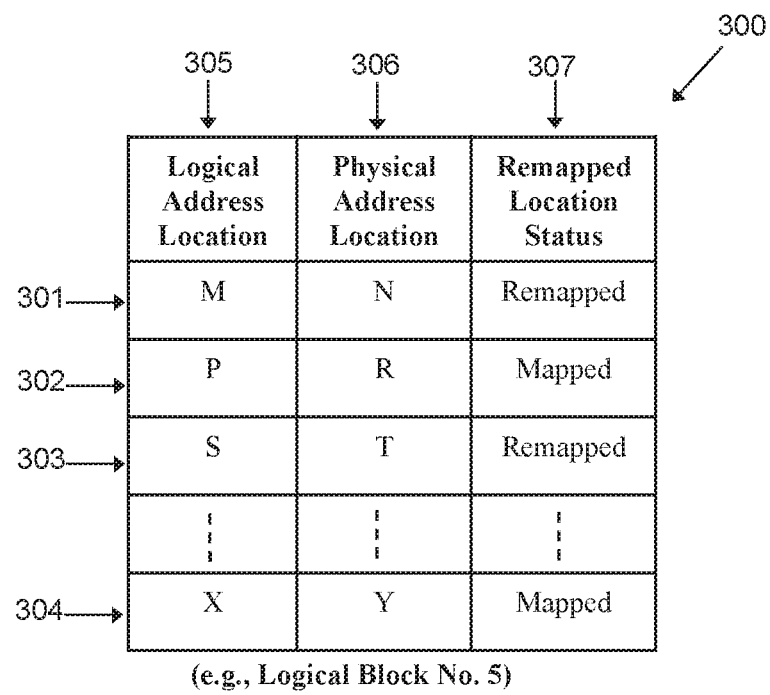
FIG. 3 illustrates a diagram of example block mapping table, according to an embodiment.

The address mapping tables 116 can include an address mapping table for each of the applicable logical blocks. Each of the address mapping tables 116 includes the logical address locations of the respective logical block, the physical address locations that the logical address locations are mapped to, and a remapping status of the logical address locations. FIG. 3 illustrates a diagram of example block mapping table, according to an embodiment. For example, referring to FIG. 2, an address mapping table can be generated for each of the logical blocks 206 included within the block mapping table 200. An example address mapping table 300 is shown in FIG. 3 and is representative of one of the logical blocks—e.g., the logical block number 5 shown in record 203 of FIG. 2. While the description for FIG. 3 is provided with reference to logical block number 5 of FIG. 2, it should be appreciated that the underlying principles are applicable to the logical blocks 206 in general.

In FIG. 3, the address mapping table 300 is shown for the logical block number 5 of the record 203 of FIG. 2 and includes the following fields: a logical address location 305 (of the logical block number 5), a physical address location 306 that the logical address location 305 is mapped to, and a remapped location status 307 of the logical address location 305. The address mapping table 300 further includes records (or rows) for each of the applicable logical address locations for the logical block number 5. For the sake of clarity and brevity, only records for four example logical address locations—e.g., M, P, S, and X—are shown as respective records 301, 302, 303, and 304 of the address mapping table 300. However, it should be appreciated that records for the additional logical address locations are included in the address mapping table 300 although not shown, as represented by the dashed lines in the address mapping table 300. The number of logical address locations and the number of logical address locations for each logical block can vary in different implementations.

The remapped location status 307 indicates whether a write to the remapped block 208 (e.g., the remapped block number 23) has occurred for the logical address location 305 after the initiation of the remapping process of the logical block number 5. A remapped location status 307 of "mapped" indicates that a write to the remapped block 208 has not yet been performed for the logical address location 305. A remapped location status 307 of "remapped" indicates that a write to the remapped block 208 has occurred for the logical address location 305. The remapping process of the logical block number 5 remains "in progress" until a write to the remapped block 208 has occurred for all logical address locations 305 of the logical block number 5, at which point the remapping process of the logical block number 5 is completed, which can be indicated accordingly in the remapping status 209 of the block remapping table 200 of FIG. 2.

For address mapping tables of logical blocks that are mapped but not remapped (e.g., the logical block 3 in the record 202 of FIG. 2), the remapped location status 307 can be left blank for all logical address locations, or indicated as "mapped" for every logical address location, for instance. In such cases, read and write operations for all of the logical address locations are performed at the physical address location 306 of the mapped block 207.

During the remapping process of one of the logical blocks 206 (e.g., the logical block number 5), read and write operations can be performed at the physical address location 306 in either the mapped block 207 or remapped block 208, depending on the remapped location status 307. For example, during the remapping process, write operations are performed at the physical address location 306 in the remapped block 208 when the remapped location status 307 indicates either mapped or remapped. In other words, writes are performed on the remapped block in the remapping process. In contrast, the read operations are performed at the physical address location 306 in the mapped block 207 when the remapped location status 307 is mapped because the data still resides in the mapped block. Read operations are performed at the physical address location 306 in the remapped block 208 when the remapped location status 307 is remapped because the data was written into the remapped block when a previous write operation to the remapped block occurred. Put another way, read operations are performed at the physical address location 306 in the mapped block 207 if a write to the remapped block 208 has not yet been performed for the logical address location 305 during the remapping process, and performed at the physical address location 306 in the remapped block 208 if a write to the remapped block 208 has already been performed for the logical address location 305 during the remapping process.

The following is an illustrative and non-limiting example using the data shown in FIGS. 2 and 3. In FIG. 2, the record 203 indicates that logical block number 5 is mapped to the mapped block number 6, but in progress of being remapped to the remapped block number 23. Furthermore, since the initiation of the remapping process, a write to the remapped block number 6 has occurred for 40 of the logical address locations of logical block number 5, as indicated by the locations status 210. In the address mapping table 300 of the logical block number 5 shown in FIG. 3, the remapped location status 307 indicates "remapped" for the corresponding 40 logical address locations (although only 2 of the 40 are shown in FIG. 3—logical address location M and S).

For instance, for the record 301 of FIG. 3, the logical address location M is mapped to physical address location N. The remapped location status 307 is indicated as remapped, which indicates that a write operation has been performed for the logical address location M after the remapping process was initiated for the logical block number 5. As the remapped location status 307 is remapped, both a read and write to the logical address location M of the logical block number 5 will result in a respective read or write to the physical address location N of the remapped block number 23.

For the record 302 in FIG. 3, the logical address location P is mapped to physical address location R. The remapped location status 307 is mapped, which indicates that a write operation has not yet been performed for the logical address location P after the initiation of the remapping process of the logical block number 5. As the remapping status is mapped, a read from the logical address location P of the logical block number 5 results in a read to the physical address location R of the mapped block number 6. On the other hand, a write to the logical address location P of the logical block number 5 would result in a write to the physical address location R of the remapped block number 23, which then causes the remapped location status 307 to change from mapped to remapped.

Figure 4:
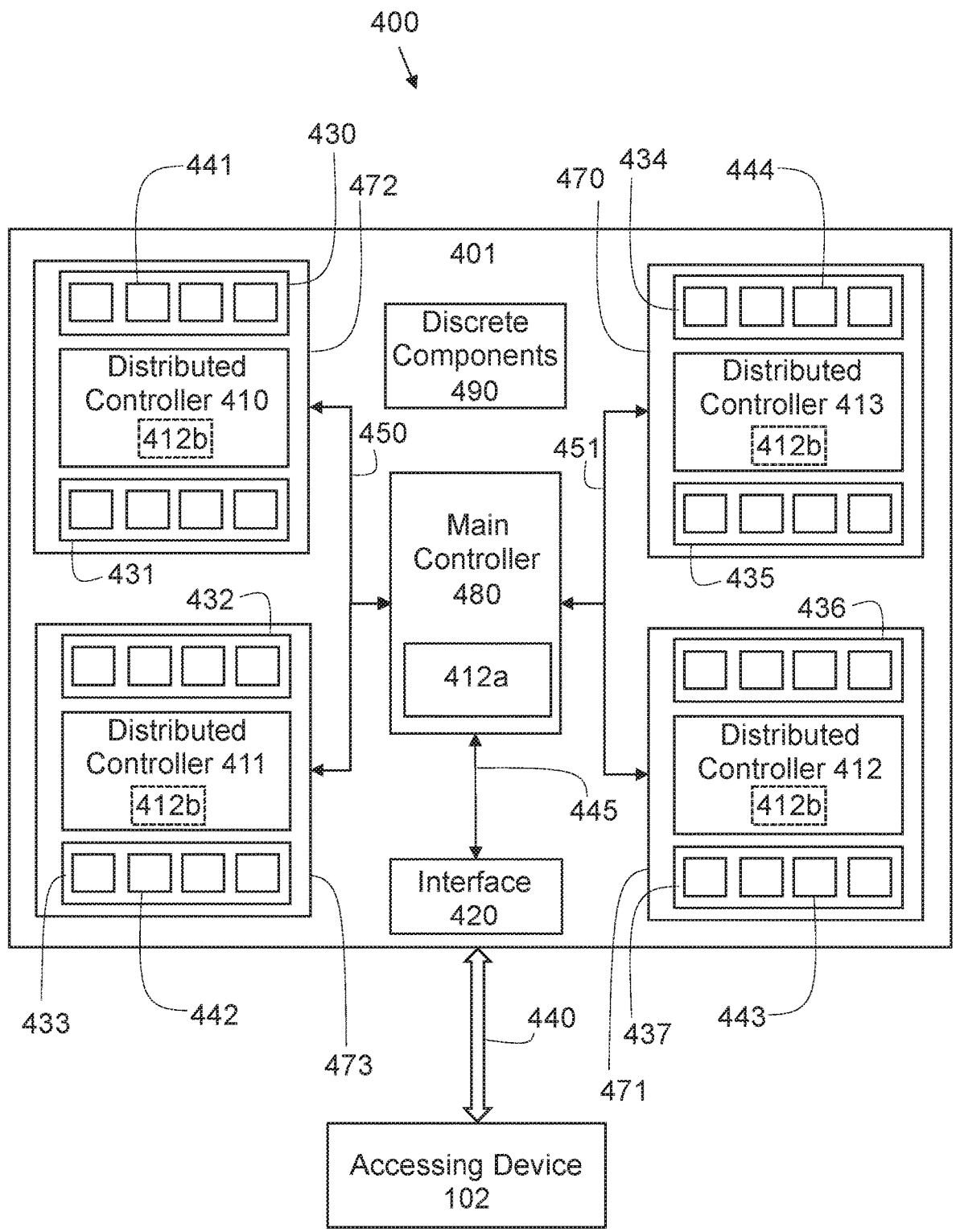
FIG. 4 illustrates a block diagram of an example data storage system having dynamic remapping capability and a distributed control architecture, according to an embodiment.

In certain aspects of the present disclosure, the dynamic remapping techniques can be implemented in a data storage device having more than one controller configured in a distributed control architecture. FIG. 4 illustrates a block diagram of an example data storage system having dynamic remapping capability and a distributed control architecture, according to an embodiment. In FIG. 4, a storage system 400 is shown including a data storage device (or system) 401 communicatively coupled to an accessing device 102. The data storage device 401 is shown including a main controller 480, four memory modules 470, 471, 472 and 473, an interface 420, and discrete components 490. The data storage device 401 can be communicatively coupled to the accessing device 102 in a variety of manners and applications, such as similarly described in FIG. 1. In an embodiment, the main controller 480, the four memory modules 470, 471, 472 and 473, the accessing interface 420, and the discrete components 490 can be implemented on a main board that is coupled to the accessing device 102. In another embodiment, the main controller 480 and the distributed controllers 410, 411, 412, and 413 can be embedded or integrated, such as in a application-specific integrated circuit (ASIC) or field programmable gate array (FPGA) for example, and can functionally operation as a single controller. It should be appreciated that a different number of memory modules than four can also be implemented.

The main controller 480 can manage host accesses, memory management, and other background tasks, for example. The main controller 480 is shown coupled to the interface 420 of FIG. 4 via a bus 445. The main controller 480 is communicatively coupled to the accessing device 102 via the interface 420 that enables communication via the communication path 440 between the data storage device 401 and the accessing device 102. The interface 420 can include, for example, a PCIe, SATA, USB, Open CAPI, or any other standard or proprietary interface.

Each of the memory modules 470, 471, 472 and 473 is managed by the respective distributed controllers 413, 412, 410, and 411. Each of the distributed controllers 410, 411, 412, and 413 manages respective memory banks in its domain. In the example embodiment shown in FIG. 4, the distributed controller 413 manages memory banks 434 and 435; the distributed controller 412 manages memory banks 436 and 437; the distributed controller 410 manages memory banks 430 and 431; and the distributed controller 411 manages memory banks 432 and 433. A different number of memory banks may be managed by any distributed controller in other embodiments. In one embodiment, the data storage device 404 may include (or correspond to) an SSD. The main controller 480 communicates with the memory banks 430, 431, 432, 433, 434, 435, 436, and 437 via busses 450 and 451.

Each memory bank 431, 432, 433, 434, 435, 436, and 437 can have one or more memory devices. The memory banks 430 and 431 are shown having four memory devices 441; the memory banks 432 and 433 are shown having four memory devices 442; the memory banks 434 and 435 are shown having four memory devices 444; and the memory banks 436 and 437 are shown having four memory devices 443. The memory devices 441, 442, 443, and 444 shown are exemplary and are not an exhaustive list. Each memory bank, such as memory bank 430, can have several memory devices, and can have a different number of memory devices than shown in the example embodiment of FIG. 4. It should be appreciate that the discussion above for the features and functions of the memory devices 106 can also apply to the memory device 441, 442, 443, and 444. For the sake of clarity and brevity, the features and functions are not repeated here for FIG. 4.

Each of the memory banks 430, 431, 432, 433, 434, 435, 436, and 437 can be of a different technology. In some implementations, the data storage device 401 can operate in data centers where usage encompasses several scenarios. Some of the data may be accessed frequently and is "hot", while other data may be accessed infrequently and is practically "cold". In such case, for instance, the memory banks 430, 431, 432, 433, 434, 435, 436, and 437 can be configured of different technologies to accommodate (or account for) such "hybrid" requirements by supporting technology that can be tailored to different usage scenarios.

In an embodiment, the memory modules 470, 471, 472 and 473 can be mounted directly on a main board of the data storage device 401. In another embodiment, the memory module can be disposed a memory card that can be coupled to the main board of the data storage device 401 via sockets and ribbons connectors, for instance. The control of the various memory banks can be transparent to the accessing device 102 (e.g., a server or other host). The distributed controllers 410, 411, 412, and 413 shown in FIG. 4 may include an error correction code (ECC) engine. The distributed controllers 410, 411, 412, and 413 may be configured to support ECC and memory management schemes specific to the technology used by the memory modules 470, 471, 472, and 473. The memory devices 441, 442, 443, and 444 are illustrative examples of memory devices used in the memory banks 430, 431, 432, 433, 434, 435, 436, and 437. The number of memory devices implemented in a memory bank is not restricted to the number shown in FIG. 4. Other embodiments may include a different number of memory devices in each memory bank of each memory module. The memory modules 470, 471, 472 and 473 may include, for example, Flash, ReRam, MRAM, any other non-volatile memory (NVM) technology, or a combination of different technology devices.

The main controller 480 includes a dynamic remapping module 412a. In one embodiment, the dynamic remapping module 412a includes the features and functions of the block mapping module 113, the block mapping table 114, the address mapping module 115, the address mapping tables 116, the L2L mapping module 121, and the L2L mapping table 122 of the dynamic remapping module 112 of FIG. 1A. The tables 114, 116, and 122 can be stored within memory internal or external to the main controller 480. For the sake of brevity and clarity, each feature and function applicable to the dynamic remapping module 112 of FIG. 1A is not repeated here for the dynamic remapping module 412a of FIG. 4.

In another embodiment, the data storage device 401 also includes additional dynamic remapping modules 412b implemented within the distributed controllers 410, 411, 412, and 413. The dynamic remapping modules 412b are shown with dotted lines to represent the implementation of an alternative embodiment. In this embodiment, the features and functions of the block mapping module 113, the block mapping table 114, the address mapping module 115, the address mapping tables 116, the L2L mapping module 121, and the L2L mapping table 122 of the dynamic remapping module 112 of FIG. 1A can be implemented partially in the dynamic remapping module 412a and partially in the dynamic remapping modules 412b. The features and functions of the block mapping module 113, the block mapping table 114, the address mapping module 115, the address mapping tables 116, the L2L mapping module 121, and the L2L mapping table 122 can be divided up between the dynamic remapping module 412a and the dynamic remapping modules 412b in various combinations. In an embodiment, the operations common to all the memory devices can be performed by the main controller while the operations limited to the memory devices controlled by the distributed controllers can be performed by the respective distributed controllers. In one embodiment, the dynamic remapping module 412a can include the L2L mapping module 121, the L2L mapping table 122, the block mapping module 113, and the block mapping table 114, while each of the dynamic remapping modules 412b of the distributed controllers 410, 411, 412, and 413 can include the address mapping module 115 and the address mapping tables 116 for the memory blocks within the respective memory devices 441, 442, 443, and 444. In yet another embodiment, the main controller 480 does not include the dynamic remapping module 412a, and the block mapping module 113, the block mapping table 114, the address mapping module 115, the address mapping tables 116, the L2L mapping module 121, and the L2L mapping table 122 are implemented in each of the dynamic remapping modules 412b of the distributed controllers 410, 411, 412, and 413 for the memory blocks within the respective memory devices 441, 442, 443, and 444.

Figure 5:
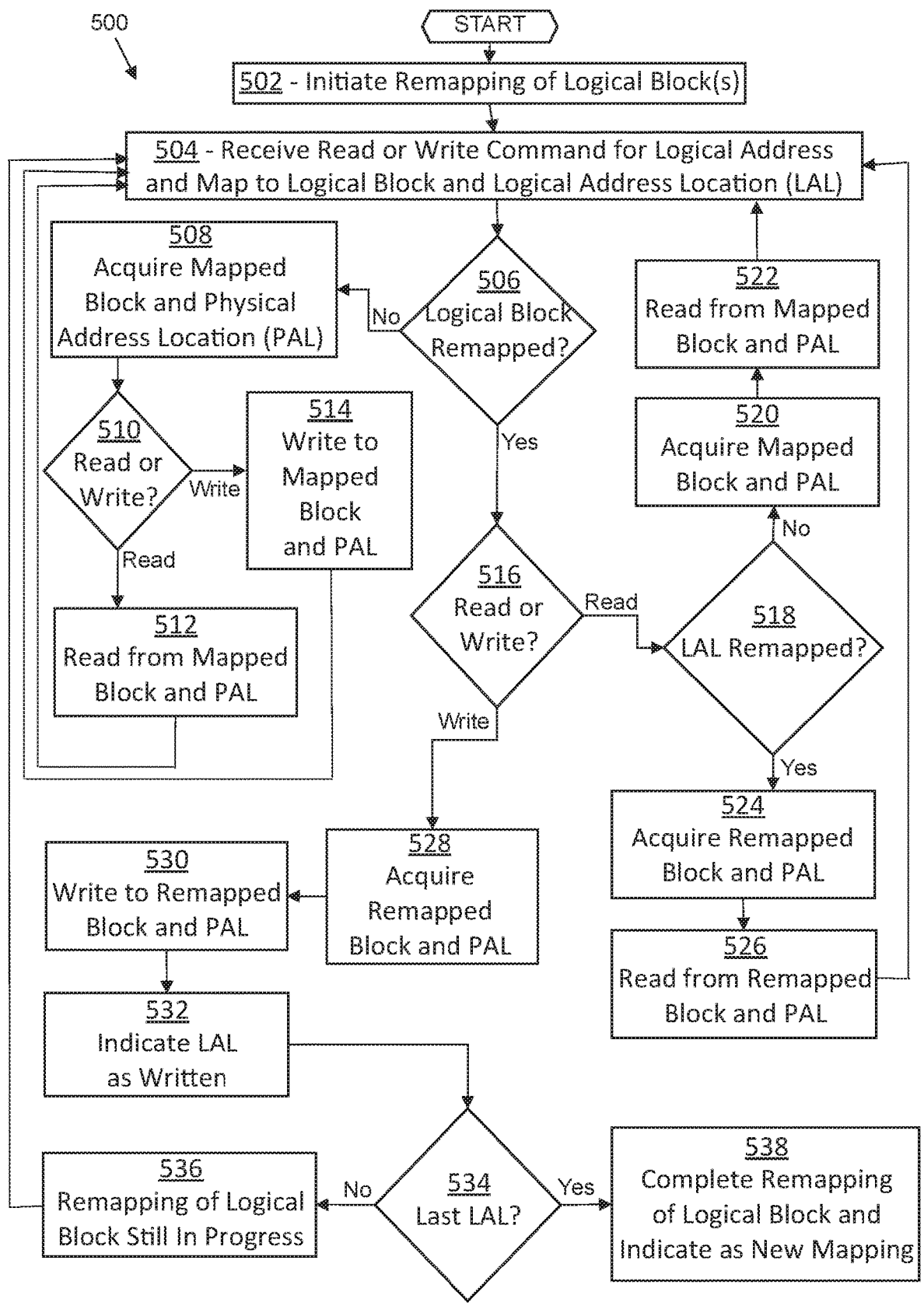
FIG. 5 illustrates a flowchart for an example method of dynamically remapping memory, according to an embodiment.

FIG. 5 illustrates a flowchart for an example method 500 of dynamically remapping memory, according to an embodiment. Throughout the description for FIG. 5, examples are provided with reference to FIGS. 1 through 4 to facilitate understanding. At block 502 of the method 500, the remapping of one or more logical blocks is initiated. The remappings can be initiated, for example, when the controller (e.g., the controller 105 or 480) receives programming instructions to remap one or more logical blocks. In an embodiment, the controller can be programmed with software to initiate mapping or remapping configurations (or states) at various times, such as upon first initialization of the controller (e.g., based on factory settings), at predetermined time intervals, when a software update is uploaded, etc. As another example, the controller can be programmed with software to initiate remapping configurations every time the controller is powered on. For example, the current mapping and remapping configuration can be saved upon shutdown and then reinitiated upon power up. As yet another example, the controller can be programmed to perform a diagnostic test on the memory devices at various times and to generate a suitable remapping configuration if remapping is necessary (e.g., to replace defective memory devices, to provide wear leveling, etc.).

When instructions are received to remap a logical block to a physical block of one of the memory devices (e.g., one of the memory devices 106 or one of the memory devices 441, 442, 443, and 444), the block mapping module 113 sets the physical block number as the remapped block 208 in the block mapping table 200 for the logical block 206 that is to be remapped. The block mapping module 113 also sets the remapping status 209 to "in progress" and the locations status 210 to "0" for the logical block 206 that is to be mapped. The address mapping module 115 accesses the address mapping table 300 for the logical block 206 that is to be remapped, and sets the remapped location status 307 of all the logical address locations 305 to "mapped," if not already set to mapped.

Although the initiation of the remapping process is shown in block 502 of FIG. 5, it should be appreciated that the remapping of logical blocks can occur dynamically at any time during the operation of the data storage device (e.g., the data storage device 101 or 401), and independently at different times from one another. For example, the remapping of one logical block can be initiated while another logical is already in the remapping process, such as when performing operations within blocks 502 through 538.

At block 504, a command to read from or write to a logical address is received and the logical address is then mapped to a logical block and a logical address location. For example, when the controller receives a read or write command from the accessing device 102, the L2L mapping module 121 can identify the logical address and acquire the logical block and logical address location based on the mappings provided in the L2L mapping table 122. If a write command is received, the data to be written is also included with the write command.

In another embodiment, the read or write command received can include information identifying the logical block number and logical address location. In such case, the mapping operation provided by the L2L mapping module 121 is not required, and the L2L mapping module 121 and L2L mapping table 122 may not implemented.

At block 506, a determination is made as to whether the logical block is remapped. For example, the block mapping table 200 can be accessed by the block mapping module 113 to determine whether a remapped block 208 is indicated for the logical block 206.

If the logical block is not remapped, then at block 508, the mapped block that the logical block is mapped to can be acquired, as well as the physical address location (PAL) that the logical address location is mapped to. For example, the block mapping table 200 can be accessed by the block mapping module 113 to acquire the mapped block 207 indicated for the logical block 206. The address mapping table 300 for the logical block 206 can be accessed by the address mapping module 115 to acquire the physical address location 306 that the logical address location 305 is mapped to.

At block 510, a determination is made as to whether the command is a read or write command. If the command received is a read command, then data is read from the physical address location in the mapped block, as represented by block 512. If the command is a write command, then data is written to the physical address location in the mapped block, as represented by block 514. For example, in one embodiment, the block mapping module 113 and address mapping module 115 can provide the physical address location 306 and the mapped block 207 to an ECC engine (e.g., the ECC engine 111) so it can be encoded and sent to the appropriate memory device (e.g., one of the memory devices 106 of FIGS. 1A and 1B, or one of the memory devices 441, 442, 443, and 444 of FIG. 4) having the mapped block 207. After blocks 512 and 514, the process can be repeated when another read or write command is received, as represented by the arrows from blocks 512 and 514 back to block 504, respectively.

If at block 506 it is determined that the logical block is remapped, then at block 516 a determination is made as to whether the command received at 504 is a read or write command. If a read command, then a determination is made as to whether the logical address location (LAL) is remapped, as represented by block 518. For example, the address mapping module 115 can access the address mapping tables 116 to acquire the remapped location status 307 for the logical address location 305 of the logical block 206. As previously described for FIG. 3, the remapped location status 307 indicates whether an initial write to the remapped block for the logical address location 305 has occurred (e.g., remapped) or not (e.g., mapped) after the initiation of the remapping of the logical block 206.

If, at block 518, the logical address location 305 is mapped, then at block 520 the mapped block 207 that the logical block 206 is mapped to is acquired, as well as the physical address location 306 that the logical address location 305 is mapped to. Block 520 can be performed in a similar manner as explained for block 508, for example.

At block 522, data is read from the physical address location 306 in the mapped block 207. Block 522 can be performed in a similar manner as explained for block 512, for example. After block 522, the process can be repeated when another read or write command is received, as represented by the arrow from block 522 back to block 504.

If, at block 518, the logical address location 305 is remapped, then at block 524 the remapped block 208 that the logical block 206 is remapped to is acquired, as well as the physical address location 306 that the logical address location 305 is mapped to. For example, the block mapping table 200 can be accessed by the block mapping module 113 to acquire the remapped block 208 indicated for the logical block 206. The address mapping table 300 for the logical block 206 can be accessed by the address mapping module 115 to acquire the physical address location 306 that the logical address location 305 is mapped to.

At block 526, data is read from the physical address location 306 in the remapped block 208. For example, the block mapping module 113 and address mapping module 115 can provide the physical address location 306 and the remapped block 208 to an ECC engine (e.g., the ECC engine 111) so it can be encoded and sent to the appropriate memory device (e.g., one of the memory devices 106 of FIGS. 1A and 1B, or one of the memory devices 441, 442, 443, and 444 of FIG. 4) having the remapped block 208. After block 526, the process can be repeated for when another read or write command is received, as represented by the arrow from block 526 back to block 504.

If a write command is present at block 516, then at block 528 the remapped block 208 that the logical block 206 is remapped to is acquired, as well as the physical address location that the logical address location is mapped to. Block 528 can be performed as similarly described for block 524, and for the sake of clarity and brevity is not repeated here.

At block 530, data is written to the physical address location 306 in the remapped block 208. For example, in one embodiment, the block mapping module 113 and address mapping module 115 can provide the physical address location 306 and the remapped block 208 to an ECC engine (e.g., the ECC engine 111) so it can be encoded and sent to the appropriate memory device (e.g., one of the memory devices 106 of FIGS. 1A and 1B, or one of the memory devices 441, 442, 443, and 444 of FIG. 4) having the mapped block 207.

At block 532, the logical address location 305 for the logical block 206 is indicated as having been written to since the initiation of the remapping of the logical block 206. For example, if the remapped location status 307 of the address mapping table 300 is remapped (e.g., the logical address location 305 has already been written to since the initiation of the remapping), then the remapped location status 307 is maintained as remapped. On the other hand, if the remapped location status 307 is mapped (e.g., the logical address location 305 has not yet been written to since the initiation of the remapping), then the address mapping module 115 changes the remapped location status 307 from mapped to remapped. Furthermore, the block mapping module 113 changes the locations status 210 of the block mapping table 200 to reflect an additional logical address location as being remapped, such as by incrementing the count indicated in the locations status 210.

At block 534, a determination is made as to whether the logical address location at block 530 is the last logical address location of the logical block to be written to. For example, the block mapping module 113 can access the address mapping table 116 for the logical block 206 to determine if the locations status 210 indicates a count equivalent to the total number of logical address locations 305 for the logical block 206. Alternatively, the address mapping module 115 can access the address mapping table 300 to determine if the remapped location status 307 of all logical address locations 305 of the logical block 206 are indicated as remapped.

If, at block 534, not all logical address locations 305 are remapped, then the remapping process of the logical block 206 is still in progress, as represented by block 536. After block 536, the process can be repeated when another read or write command is received, as represented by the arrow from block 536 back to block 504.

If, at block 534, all logical address locations 305 are remapped, then the remapping process of the logical block 206 is completed and the remapped block becomes the "new" mapped block, as represented by block 538. For example, in one embodiment, once the remapping is complete, the block mapping module 113 updates the block mapping table 200 to reflect that the remapped block (e.g., the remapped block 208) is now the new mapped block (e.g., the mapped block 207). For instance, the physical block number listed as the remapped block 208 is entered as the mapped block 207. Furthermore, the values for the remapped block 208, remapping status 209, and the locations status 210 are cleared to reflect that the logical block is now considered mapped. Still further, the address mapping module 115 changes the remapped location status 307 of all the logical address locations for the logical block to mapped from remapped to reflect that the logical block is now considered mapped.

Figure 6:
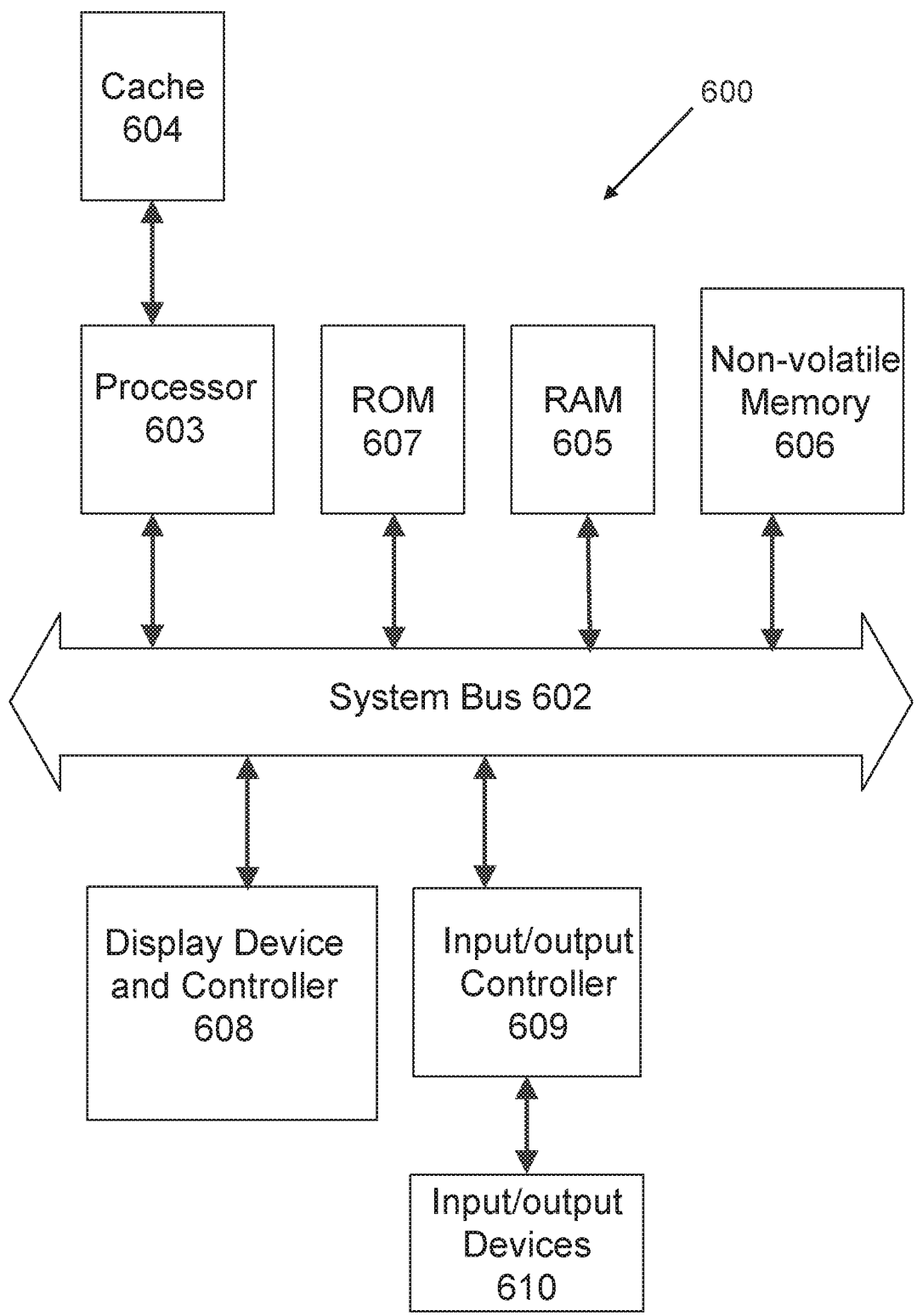
FIG. 6 depicts a block diagram of an exemplary computer system (e.g., accessing device), according to an embodiment.

FIG. 6 depicts a block diagram of an exemplary computer system (e.g., accessing device), according to an embodiment. Note that while FIG. 6 illustrates various components of a computer system, it is not intended to represent any particular architecture or manner of interconnecting the components. The computer system 600 shown in FIG. 6 may represent an example accessing device (e.g., the accessing devices 102), such as a server for example. It is also be appreciated that networked computers and other data processing systems which have fewer components, or more components, can also be implemented as the computer system.

As shown, the host system 600 includes a system bus 602, which is coupled to a microprocessor 603, a Read-Only Memory (ROM) 607, a volatile Random Access Memory (RAM) 605, as well as other non-volatile memory 606. In the illustrated embodiment, microprocessor 603 is coupled to cache memory 604. A system bus 602 can be adapted to interconnect these various components together and also interconnect components 603, 607, 605, and 606 to other devices, such as a display controller and display device 608, and to peripheral devices such as input/output ("I/O") devices 610. Types of I/O devices can include keyboards, modems, network interfaces, printers, scanners, video cameras, or other devices well known in the art. Typically, I/O devices 610 are coupled to the system bus 602 through I/O controllers 609. In one embodiment the I/O controller 609 includes a Universal Serial Bus ("USB") adapter for controlling USB peripherals or other type of bus adapter.

RAM 605 can be implemented as dynamic RAM ("DRAM"), which requires power continually in order to refresh or maintain the data in the memory. The non-volatile memory 606 can include a magnetic hard drive, magnetic optical drive, optical drive, DVD RAM, solid-state storage drive (e.g., the data storage device 101 of FIG. 1), or other type of memory system that maintains data after power is removed from the system. While FIG. 6 shows that non-volatile memory 606 as a local device coupled with the rest of the components in the computer system 600, it will be appreciated by skilled artisans that the described techniques may use a non-volatile memory remote from the system, such as a network storage device coupled with the host system through a network interface, such as a modem, Ethernet interface, or any other standard or proprietary interface. In certain embodiments, the non-volatile memory 606 can be coupled directly to the processor 603 instead of through the system bus 602 so that the processor 602 can talk directly to the non-volatile memory 606, such as with a non-volatile dual in-line memory module (NVDIMM).

EXAMPLE EMBODIMENTS

In certain aspects of the present disclosure, a data storage system is provided and includes non-volatile memory and one or more controllers coupled to the non-volatile memory. The one or more controllers are configured to initiate a remapping of a first logical block from a mapped block to a remapped block. A plurality of logical address locations for the first logical block is mapped to a plurality of physical address locations in the mapped block. The mapped block and the remapped block include the non-volatile memory. The one or more controllers are further configured to: receive a first read command; determine that the first read command is for reading from a first logical address location of the first logical block; determine that the first logical address location is mapped to a first physical address location of the plurality of physical address locations; read first data from the first physical address location of the mapped block; receive a first write command; determine that the first write command is for writing second data to the first logical address location of the first logical block; and write the second data to the first physical address location of the remapped block. The receiving of the first read command occurs at a time: after the initiating of the remapping of the first logical block; and before the writing of the second data to the first physical address location of the remapped block.

In an embodiment, the one or more controllers are further configured to, in response to the writing of the second data to the first physical address location of the remapped block, indicate that the first logical address location is remapped to the remapped block in an address mapping table for the first logical block.

In an embodiment, the one or more controllers are further configured to: receive a second read command; determine that the second read command is for reading from a first logical address location of the first logical block, wherein the receiving of the second read command occurs after the writing of the second data to the first physical address location of the remapped block; and read the second data from the first physical address location of the remapped block.

In an embodiment, the one or more controllers are further configured to: receive a second write command; determine that the second write command is for writing third data to a second logical address location of the first logical block; determine that the second logical address location is mapped to a second physical address location of the plurality of physical address locations; and write the third data to the second physical address location of the remapped block.

In an embodiment, the one or more controllers are further configured to: receive a second read command; determine that the second read command is for reading from the second logical address location of the first logical block. The receiving of the second read command occurs: after the initiating of the remapping of the first logical block, and before the writing of the third data to the second physical address location of the remapped block. The one or more controllers are further configured to: read fourth data from the second physical address location of the mapped block; receive a third read command; and determine that the third read command is for reading from the second logical address location of the first logical block. The receiving of the third read command occurs after the writing of the third data to the second physical address location of the remapped block. The one or more controllers are further configured to read the third data from the second physical address location of the remapped block.

In an embodiment, the one or more controllers are further configured to: track when an initial write to the remapped block occurs for each of the plurality of logical address locations after the initiating of the remapping of the first logical block; determine that the initial writes occurred for all of the plurality of logical address locations; and, in response to the determining that the initial writes occurred for all of the plurality of logical address locations, indicate that the remapping of the first logical block to the remapped block is complete.

In an embodiment, the one or more controllers are further configured to: in response to the writing of the second data to the first physical address location of the remapped block, indicate that the first logical address location is remapped to the remapped block in an address mapping table for the first logical block; determine that the first logical address location is a last of the plurality of logical address location to be remapped to the remapped block; and, in response to the determining that the first logical address location is the last of the plurality of logical address location to be remapped to the remapped block, indicate that the remapping of the first logical block to the remapped block is complete.

In an embodiment, the one or more controllers are further configured to receive instructions to remap the first logical block from the mapped block to the remapped block. The remapping of the first logical block from the mapped block to the remapped block occurs dynamically during operation of the mapped block.

In an embodiment, the one or more controllers are included within a solid-state storage device. The mapped block and remapped block include Flash memory.

In an embodiment, the determining that the first read command is for a first logical address location of the first logical block includes: determining that the first read command is for reading from a first logical address; and translating the first logical address to the first logical address location of the first logical block. The determining that the first write command is for writing the second data to the first logical address location of the first logical block includes: determining that the first write command is for writing the second data to the first logical address; and translating the first logical address to the first logical address location of the first logical block.

In some aspects of the present disclosure, a method for dynamically remapping memory addresses in a data storage system is provided and includes initiating a remapping of a first logical block from a mapped block to a remapped block. A plurality of logical address locations for the first logical block is mapped to a plurality of physical address locations in the mapped block, and the mapped block and the remapped block include non-volatile memory. The method further includes receiving a first read command; determining that the first read command is for reading from a first logical address location of the first logical block; determining that the first logical address location is mapped to a first physical address location of the plurality of physical address locations; reading first data from the first physical address location of the mapped block; receiving a first write command; determining that the first write command is for writing second data to the first logical address location of the first logical block; and writing the second data to the first physical address location of the remapped block. The receiving of the first read command occurs at a time: after the initiating of the remapping of the first logical block; and before the writing of the second data to the first physical address location of the remapped block.

In an embodiment, the method further includes, in response to the writing of the second data to the first physical address location of the remapped block, indicating that the first logical address location is remapped to the remapped block in an address mapping table for the first logical block.

In an embodiment, the method further includes: receiving a second read command; and determining that the second read command is for reading from a first logical address location of the first logical block. The receiving of the second read command occurs after the writing of the second data to the first physical address location of the remapped block. The method further includes reading the second data from the first physical address location of the remapped block.

In an embodiment, the method further includes: receiving a second write command; determining that the second write command is for writing third data to a second logical address location of the first logical block; determining that the second logical address location is mapped to a second physical address location of the plurality of physical address locations; and writing the third data to the second physical address location of the remapped block.

In an embodiment, the method further includes: receiving a second read command; determining that the second read command is for reading from the second logical address location of the first logical block. The receiving of the second read command occurs: after the initiating of the remapping of the first logical block; and before the writing of the third data to the second physical address location of the remapped block. The method further includes: reading fourth data from the second physical address location of the mapped block; receiving a third read command; determining that the third read command is for reading from the second logical address location of the first logical block. The receiving of the third read command occurs after the writing of the third data to the second physical address location of the remapped block. The method further includes reading the third data from the second physical address location of the remapped block.

In an embodiment, the method further includes: tracking when an initial write to the remapped block occurs for each of the plurality of logical address locations after the initiating of the remapping of the first logical block; determining that the initial writes occurred for all of the plurality of logical address locations; and, in response to the determining that the initial writes occurred for all of the plurality of logical address locations, indicating that the remapping of the first logical block to the remapped block is complete.

In an embodiment, the method further includes: in response to the writing of the second data to the first physical address location of the remapped block, indicating that the first logical address location is remapped to the remapped block in an address mapping table for the first logical block; determining that the first logical address location is a last of the plurality of logical address location to be remapped to the remapped block; and, in response to the determination that the first logical address location is the last of the plurality of logical address location to be remapped to the remapped block, indicating that the remapping of the first logical block to the remapped block is complete.

In an embodiment, the method further includes receiving instructions to remap the first logical block from the mapped block to the remapped block. The remapping of the first logical block from the mapped block to the remapped block occurs dynamically during operation of the mapped block.

In an embodiment, the dynamically remapping of the data occurs within the one or more controllers of a solid-state storage device, and wherein the mapped block and remapped block include Flash memory.

In an embodiment, the determining that the first read command is for a first logical address location of the first logical block includes: determining that the first read command is for reading from a first logical address; and translating the first logical address to the first logical address location of the first logical block. The determining that the first write command is for writing the second data to the first logical address location of the first logical block includes: determining that the first write command is for writing the second data to the first logical address; and translating the first logical address to the first logical address location of the first logical block.

In some aspects of the present disclosure, the method for dynamically remapping memory addresses in a data storage system can be performed by a processing unit, such as a processor, microprocessor, processor core, etc. In an embodiment, the method for dynamically remapping memory addresses in a data storage system can be performed by a memory management unit within a computing system.

In some aspects of the present disclosure, a non-transitory machine-readable storage medium storing machine-executable instructions is provided that, when executed, cause a system to perform a method for dynamically remapping memory addresses. The method includes initiating a remapping of a first logical block from a mapped block to a remapped block. A plurality of logical address locations for the first logical block is mapped to a plurality of physical address locations in the mapped block, and the mapped block and the remapped block include non-volatile memory. The method further includes receiving a first read command; determining that the first read command is for reading from a first logical address location of the first logical block; determining that the first logical address location is mapped to a first physical address location of the plurality of physical address locations; reading first data from the first physical address location of the mapped block; receiving a first write command; determining that the first write command is for writing second data to the first logical address location of the first logical block; and writing the second data to the first physical address location of the remapped block. The receiving of the first read command occurs at a time: after the initiating of the remapping of the first logical block; and before the writing of the second data to the first physical address location of the remapped block.

In an embodiment, the method further includes, in response to the writing of the second data to the first physical address location of the remapped block, indicating that the first logical address location is remapped to the remapped block in an address mapping table for the first logical block.

In an embodiment, the method further includes: receiving a second read command; and determining that the second read command is for reading from a first logical address location of the first logical block. The receiving of the second read command occurs after the writing of the second data to the first physical address location of the remapped block. The method further includes reading the second data from the first physical address location of the remapped block.

In an embodiment, the method further includes: receiving a second write command; determining that the second write command is for writing third data to a second logical address location of the first logical block; determining that the second logical address location is mapped to a second physical address location of the plurality of physical address locations; and writing the third data to the second physical address location of the remapped block.

In an embodiment, the method further includes: receiving a second read command; determining that the second read command is for reading from the second logical address location of the first logical block. The receiving of the second read command occurs: after the initiating of the remapping of the first logical block; and before the writing of the third data to the second physical address location of the remapped block. The method further includes: reading fourth data from the second physical address location of the mapped block; receiving a third read command; determining that the third read command is for reading from the second logical address location of the first logical block. The receiving of the third read command occurs after the writing of the third data to the second physical address location of the remapped block. The method further includes reading the third data from the second physical address location of the remapped block.

In an embodiment, the method further includes: tracking when an initial write to the remapped block occurs for each of the plurality of logical address locations after the initiating of the remapping of the first logical block; determining that the initial writes occurred for all of the plurality of logical address locations; and, in response to the determining that the initial writes occurred for all of the plurality of logical address locations, indicating that the remapping of the first logical block to the remapped block is complete.

In an embodiment, the method further includes: in response to the writing of the second data to the first physical address location of the remapped block, indicating that the first logical address location is remapped to the remapped block in an address mapping table for the first logical block; determining that the first logical address location is a last of the plurality of logical address location to be remapped to the remapped block; and, in response to the determination that the first logical address location is the last of the plurality of logical address location to be remapped to the remapped block, indicating that the remapping of the first logical block to the remapped block is complete.

In an embodiment, the method further includes receiving instructions to remap the first logical block from the mapped block to the remapped block. The remapping of the first logical block from the mapped block to the remapped block occurs dynamically during operation of the mapped block.

In an embodiment, the dynamically remapping of the data occurs within the one or more controllers of a solid-state storage device, and wherein the mapped block and remapped block include Flash memory.

In an embodiment, the determining that the first read command is for a first logical address location of the first logical block includes: determining that the first read command is for reading from a first logical address; and translating the first logical address to the first logical address location of the first logical block. The determining that the first write command is for writing the second data to the first logical address location of the first logical block includes: determining that the first write command is for writing the second data to the first logical address; and translating the first logical address to the first logical address location of the first logical block.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations, or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

The processes and features described herein may be implemented in software, hardware, or a combination of software and hardware. The processes and features may be implemented as software modules, hardware modules, special-purpose hardware (e.g., application specific hardware, ASICs, DSPs, etc.), embedded controllers, hardwired circuitry, hardware logic, etc. Software content (e.g., data, instructions, and configuration) may be provided via an article of manufacture including a non-transitory, tangible computer or machine-readable storage medium, which provides content that represents instructions that can be executed. The content may result in a computer performing various functions/operations described herein.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory that, when read and executed by a processor, cause the processor to perform operations to execute the processes and features described herein. The processes and features described herein may be implemented in software, firmware, hardware (e.g., an application specific integrated circuit, or a field-programmable gate array (FPGA)), or any combination thereof. For example, the controllers described herein can include one or more processors (or processing units) that may be implemented as described above to execute the instructions. The term "processor" is used broadly herein and may include one or more processing units or circuitry, such as one or more embedded or non-embedded processors, microprocessors, hard and soft microprocessor cores, etc.

In an implementation, the processes and features described herein may be implemented as a series of executable modules run by a processor (e.g., in a computer system, individually, collectively in a distributed computing environment, embedded in a controller, etc.). The foregoing modules may be realized by hardware, executable modules stored on a computer-readable medium (or machine-readable medium), or a combination of both. For example, the modules may comprise a plurality or series of instructions to be executed by a processor in a hardware system. Initially, the series of instructions may be stored in memory, such as on a storage device. However, the series of instructions can be stored on any suitable computer readable storage medium. Furthermore, the series of instructions need not be stored locally, and could be received from a remote storage device, such as a server on a network, via the network interface. In various implementations, a module or modules can be executed by a processor or multiple processors in one or multiple locations, such as multiple servers in a parallel processing environment A computer-readable (or machine-readable) storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, Flash memory devices, etc.); other similar non-transitory (or transitory), tangible (or non-tangible) storage medium; or any type of medium suitable for storing, encoding, or carrying a series of instructions for execution by a processor to perform any one or more of the processes and features described herein. The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A data storage system, comprising:
   non-volatile memory; and
   one or more controllers coupled to the non-volatile memory, the one or more controllers configured to:
   map a first logical block to a mapped block so that a plurality of logical address locations for the first logical block are mapped to a first plurality of physical address locations in the mapped block;
   receive and execute instructions to initiate and perform a remapping process of the first logical block from the mapped block to a remapped block, the remapping process remapping the plurality of logical address locations to a second plurality of physical address locations in the remapped block,
      wherein the non-volatile memory comprises the mapped block and the remapped block,
      wherein the remapping process is complete when the plurality of logical address locations are remapped to the second plurality of physical address locations, and
      wherein, for each logical address location in the plurality of logical address locations, the instructions, which when executed by the one or more controllers, cause the one or more controllers to:
         when a write command for the corresponding logical address location is first received by the one or more controllers during the remapping process and is a first-occurring write command for the corresponding logical address location during the remapping process, perform a corresponding initial write in the remapped block and indicate the corresponding logical address location as remapped;
         when a read command for the corresponding logical address location is received by the one or more controllers during the remapping process and before the corresponding logical address location is indicated as remapped, perform a corresponding read in the mapped block; and
         when a read command for the corresponding logical address location is received by the one or more controllers during the remapping process and after the corresponding logical address location is indicated as remapped, perform a corresponding read in the remapped block;
   receive a first read command during the remapping process;
   determine that the first read command is for reading from a first logical address location of the first logical block;
   determine that the first logical address location is mapped to a first physical address location of the plurality of physical address locations;
   read first data from the first physical address location of the mapped block;
   receive a first write command during the remapping process;
   determine that the first write command is for an initial write of second data to the first logical address location of the first logical block; and
   write the second data to a first one of the second plurality of physical address locations of the remapped block;
   wherein the receiving of the first read command occurs at a time:
      after the initiating of the remapping process of the first logical block; and
      before the writing of the second data to the first physical address location of the remapped block.

2. The data storage system of claim 1, wherein the one or more controllers are further configured to, in response to the writing of the second data to the first one of the second plurality of physical address locations of the remapped block, indicate that the first logical address location is remapped to the remapped block in an address mapping table for the first logical block.

3. The data storage system of claim 1, wherein the one or more controllers are further configured to:
receive a second read command during the remapping process;
determine that the second read command is for reading from a first logical address location of the first logical block, wherein the receiving of the second read command occurs after the writing of the second data to the first one of the second plurality of physical address locations of the remapped block; and
read the second data from the first one of the second plurality of physical address locations of the remapped block.

4. The data storage system of claim 1, wherein the one or more controllers are further configured to:
receive a second write command during the remapping process;
determine that the second write command is for an initial write of third data to a second logical address location of the first logical block, wherein the second logical address location is mapped to a second physical address location of the plurality of physical address locations; and
write the third data to a second one of the second plurality of physical address locations of the remapped block.

5. The data storage system of claim 4, wherein the one or more controllers are further configured to:
receive a second read command during the remapping process;
determine that the second read command is for reading from the second logical address location of the first logical block, wherein the receiving of the second read command occurs:
after the initiating of the remapping process of the first logical block; and
before the writing of the third data to the second one of the second plurality of physical address locations of the remapped block;
read fourth data from the second physical address location of the mapped block;
receive a third read command during the remapping process;
determine that the third read command is for reading from the second logical address location of the first logical block, wherein the receiving of the third read command occurs after the writing of the third data to the second one of the second plurality of physical address locations of the remapped block; and
read the third data from the second one of the second plurality of physical address locations of the remapped block.

6. The data storage system of claim 1, wherein the one or more controllers are further configured to:
track when initial writes to the remapped block occur for each of the plurality of logical address locations after the initiating of the remapping process of the first logical block;
determine that the initial writes occurred for all of the plurality of logical address locations; and
in response to the determining that the initial writes occurred for all of the plurality of logical address locations, indicate that the remapping process of the first logical block to the remapped block is complete.

7. The data storage system of claim 1, wherein the one or more controllers are further configured to:
in response to the writing of the second data to the first one of the second plurality of physical address locations of the remapped block, indicate that the first logical address location is remapped to the remapped block in an address mapping table for the first logical block;
determine that the first logical address location is a last of the plurality of logical address location to be remapped to the remapped block; and
in response to the determining that the first logical address location is the last of the plurality of logical address location to be remapped to the remapped block, indicate that the remapping process of the first logical block to the remapped block is complete.

8. The data storage system of claim 1, wherein the one or more controllers are further configured to receive instructions to remap the first logical block from the mapped block to the remapped block;
wherein the remapping process of the first logical block from the mapped block to the remapped block occurs dynamically during operation of the mapped block;
wherein the one or more controllers are included within a solid-state storage device, and wherein the mapped block and remapped block comprise Flash memory.

9. The data storage system of claim 1, wherein the determining that the first read command is for a first logical address location of the first logical block comprises:
determining that the first read command is for reading from a first logical address; and
translating the first logical address to the first logical address location of the first logical block; and
wherein the determining that the first write command is for the initial write of the second data to the first logical address location of the first logical block comprises:
determining that the first write command is for writing the second data to the first logical address; and
translating the first logical address to the first logical address location of the first logical block.

10. A method for dynamically remapping memory addresses in a data storage system, the method comprising:
mapping, by one or more controllers configured to couple to non-volatile memory, a first logical block to a mapped block so that a plurality of logical address locations for the first logical block are mapped to a first plurality of physical address locations in the mapped block;
receiving and executing, by the one or more controllers, instructions to initiate and perform a remapping process of the first logical block from the mapped block to a remapped block, the remapping process remapping the plurality of logical address locations to a second plurality of physical address locations in the remapped block,
wherein the non-volatile memory comprises the mapped block and the remapped block,
wherein the remapping process is complete when the plurality of logical address locations are remapped to the second plurality of physical address locations, and
wherein, for each logical address location in the plurality of logical address locations, the instructions, which when executed by the one or more controllers, cause the one or more controllers to:
  when a write command for the corresponding logical address location is first received during the remapping process and is a first occurring write command for the corresponding logical address location during the remapping process, perform a corresponding initial write in the remapped block and indicate the corresponding logical address location as remapped;
  when a read command for the corresponding logical address location is received during the remapping process and before the corresponding logical address location is indicated as remapped, perform a corresponding read in the mapped block; and
  when a read command for the corresponding logical address location is received during the remapping process and after the corresponding logical address location is indicated as remapped, perform a corresponding read in the remapped block;
receiving a first read command during the remapping process;
determining that the first read command is for reading from a first logical address location of the first logical block;
determining that the first logical address location is mapped to a first physical address location of the plurality of physical address locations;
reading first data from the first physical address location of the mapped block;
receiving a first write command during the remapping process;
determining that the first write command is for an initial write of second data to the first logical address location of the first logical block; and
writing the second data to a first one of the second plurality of physical address locations of the remapped block;
wherein the receiving of the first read command occurs at a time:
  after the initiating of the remapping process of the first logical block; and
  before the writing of the second data to the first physical address location of the remapped block.

11. The method of claim 10, further comprising, in response to the writing of the second data to the first one of the second plurality of physical address locations of the remapped block, indicating that the first logical address location is remapped to the remapped block in an address mapping table for the first logical block.

12. The method of claim 10, further comprising:
receiving a second read command during the remapping process;
determining that the second read command is for reading from a first logical address location of the first logical block, wherein the receiving of the second read command occurs after the writing of the second data to the first one of the second plurality of physical address locations of the remapped block; and
reading the second data from the first one of the second plurality of physical address locations of the remapped block.

13. The method of claim 10, further comprising:
receiving a second write command during the remapping process;
determining that the second write command is for an initial write of third data to a second logical address location of the first logical block, wherein the second logical address location is mapped to a second physical address location of the plurality of physical address locations; and
writing the third data to a second one of the second plurality of physical address locations of the remapped block.

14. The method of claim 13, further comprising:
receiving a second read command during the remapping process;
determining that the second read command is for reading from the second logical address location of the first logical block, wherein the receiving of the second read command occurs:
  after the initiating of the remapping process of the first logical block; and
  before the writing of the third data to the second one of the second plurality of physical address locations of the remapped block;
reading fourth data from the second physical address location of the mapped block;
receiving a third read command during the remapping process;
determining that the third read command is for reading from the second logical address location of the first logical block, wherein the receiving of the third read command occurs after the writing of the third data to the second one of the second plurality of physical address locations of the remapped block; and
reading the third data from the second one of the second plurality of physical address locations of the remapped block.

15. The method of claim 10, further comprising:
tracking when initial writes to the remapped block occur for each of the plurality of logical address locations after the initiating of the remapping process of the first logical block;
determining that the initial writes occurred for all of the plurality of logical address locations; and
in response to the determining that the initial writes occurred for all of the plurality of logical address locations, indicating that the remapping process of the first logical block to the remapped block is complete.

16. The method of claim 10, further comprising:
in response to the writing of the second data to the first one of the second plurality of physical address locations of the remapped block, indicating that the first logical address location is remapped to the remapped block in an address mapping table for the first logical block;
determining that the first logical address location is a last of the plurality of logical address location to be remapped to the remapped block; and
in response to the determination that the first logical address location is the last of the plurality of logical address location to be remapped to the remapped block, indicating that the remapping process of the first logical block to the remapped block is complete.

17. The method of claim 10, further comprising receiving instructions to remap the first logical block from the mapped block to the remapped block;
wherein the remapping process of the first logical block from the mapped block to the remapped block occurs dynamically during operation of the mapped block; and
wherein the dynamically remapping of the data occurs within the one or more controllers of a solid-state storage device, and wherein the mapped block and remapped block comprise Flash memory.

18. The method of claim 10, wherein the determining that the first read command is for a first logical address location of the first logical block comprises:
   determining that the first read command is for reading from a first logical address; and
   translating the first logical address to the first logical address location of the first logical block; and
   wherein the determining that the first write command is for the initial write of the second data to the first logical address location of the first logical block comprises:
      determining that the first write command is for writing the second data to the first logical address; and
      translating the first logical address to the first logical address location of the first logical block.

19. A non-transitory machine-readable storage medium storing machine-executable instructions that, when executed, cause a system to perform a method for dynamically remapping memory addresses, the method comprising:
   mapping, by one or more controllers configured to couple to non-volatile memory, a first logical block to a mapped block so that a plurality of logical address locations for the first logical block are mapped to a first plurality of physical address locations in the mapped block;
   receiving and executing, by the one or more controllers, instructions to initiate and perform a remapping process of the first logical block from the mapped block to a remapped block, the remapping process remapping the plurality of logical address locations to a second plurality of physical address locations in the remapped block,
      wherein the non-volatile memory comprises the mapped block and the remapped block,
      wherein the remapping process is complete when the plurality of logical address locations are remapped to the second plurality of physical address locations, and
      wherein, for each logical address location in the plurality of logical address locations, the instructions, which when executed by the one or more controllers, cause the one or more controllers to:
         when a write command for the corresponding logical address location is received during the remapping process and is a first occurring write command for the corresponding logical address location during the remapping process, perform a corresponding initial write in the remapped block and indicate the corresponding logical address location as remapped;
         when a read command for the corresponding logical address location is received during the remapping process and before the corresponding logical address location is indicated as remapped, perform a corresponding read in the mapped block; and
         when a read command for the corresponding logical address location is received during the remapping process and after the corresponding logical address location is indicated as remapped, perform a corresponding read in the remapped block;
         receiving a first read command during the remapping process;
         determining that the first read command is for reading from a first logical address location of the first logical block;
         determining that the first logical address location is mapped to a first physical address location of the plurality of physical address locations;
         reading first data from the first physical address location of the mapped block;
         receiving a first write command during the remapping process;
         determining that the first write command is for an initial write of second data to the first logical address location of the first logical block; and
         writing the second data to a first one of the second plurality of physical address locations of the remapped block;
         wherein the receiving of the first read command occurs at a time:
            after the initiating of the remapping process of the first logical block; and
            before the writing of the second data to the first physical address location of the remapped block.

20. The non-transitory machine-readable storage medium of claim 19, wherein the method further comprises:
   receiving a second write command during the remapping process;
   determining that the second write command is for an initial write of third data to a second logical address location of the first logical block, wherein the second logical address location is mapped to a second physical address location of the plurality of physical address locations;
   writing the third data to a second one of the second plurality of physical address locations of the remapped block;
   receiving a second read command during the remapping process;
   determining that the second read command is for reading from the second logical address location of the first logical block, wherein the receiving of the second read command occurs:
      after the initiating of the remapping process of the first logical block; and
      before the writing of the third data to the second one of the second plurality of physical address locations of the remapped block;
   reading fourth data from the second physical address location of the mapped block;
   receiving a third read command during the remapping process;
   determining that the third read command is for reading from the second logical address location of the first logical block, wherein the receiving of the third read command occurs after the writing of the third data to the second one of the second plurality of physical address locations of the remapped block; and
   reading the third data from the second one of the second plurality of physical address locations of the remapped block.

* * * * *